(No Model.)
H. PETTIBONE & B. LOOMIS, Jr.
GAS BURNER FOR STOVES OR FURNACES.
No. 541,212. Patented June 18, 1895.
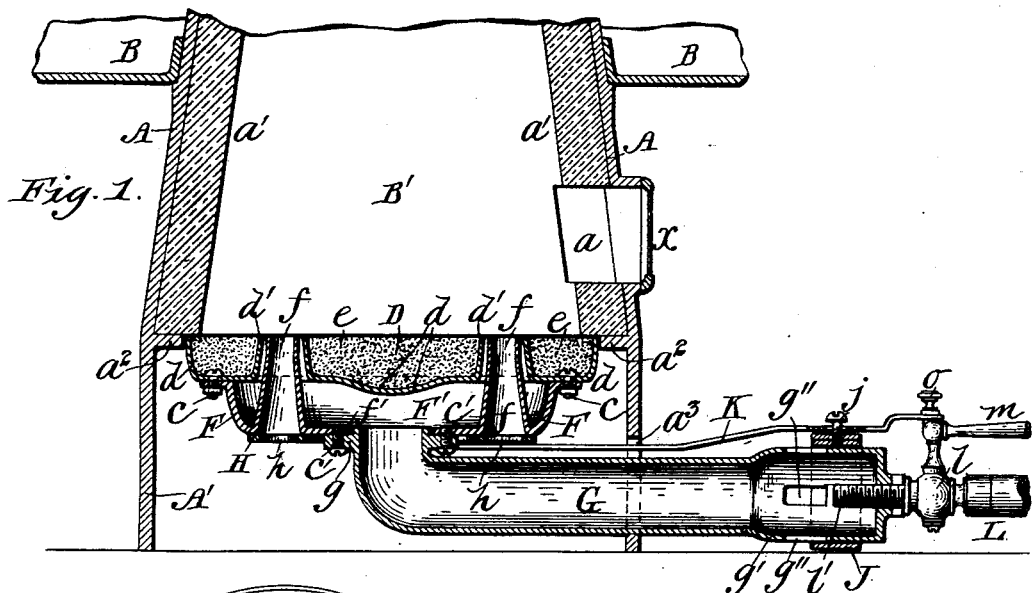
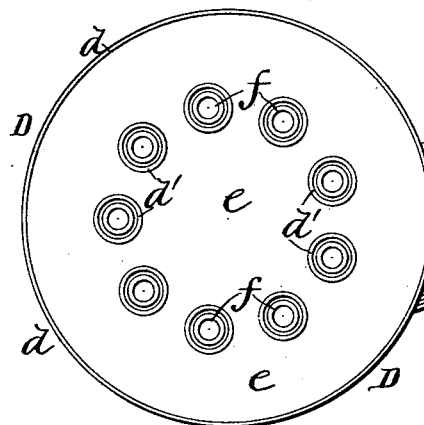
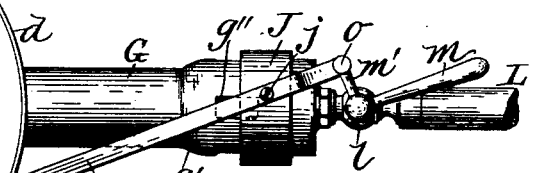
Witnesses
Severance
M. R. M. Frayser
Inventors.
Hawley Pettibone &
Burdett Loomis Jr.
By E. B. Clark
Attorney

UNITED STATES PATENT OFFICE.

HAWLEY PETTIBONE AND BURDETT LOOMIS, JR., OF HARTFORD, CONNECTICUT.

GAS-BURNER FOR STOVES OR FURNACES.

SPECIFICATION forming part of Letters Patent No. 541,212, dated June 18, 1895.

Application filed October 11, 1894. Serial No. 525,592. (No model.)

*To all whom it may concern:*

Be it known that we, HAWLEY PETTIBONE, and BURDETT LOOMIS, Jr., citizens of the United States, residing at Hartford, in the county of Hartford and State of Connecticut, have invented certain new and useful Improvements in Gas-Burners for Stoves or Furnaces; and we do hereby declare the following to be a full, clear, and exact description of the invention, such as will enable others skilled in the art to which it appertains to make and use the same.

This invention relates to an improved burner-device for illuminating gas, natural gas, or any combustible gas, which device is particularly adapted to be placed in the fire boxes of stoves, hot air furnaces, steam heating furnaces and boilers.

The object of our invention is to provide a burner which is simple in construction and entirely safe and effective in operation; and one of the special objects is to provide for simultaneously controlling the supply of gas and the primary supply of air to the mixing tube and chamber, and also controlling the secondary supply of air to the burner nozzles by means of a suitably connected gas valve, and a sleeve and damper for the air supply.

Another object is to provide for better mixing gas and air for causing complete combustion at the burner nozzle, by admitting the air centrally through an opening surrounded by a ring of inflowing gas.

The matter constituting our invention will be defined in the claims.

The devices and details of construction of our improved burner are illustrated in the accompanying drawings, in which—

Figure 1 represents a vertical section of the base of the furnace and of our gas-burner. Fig. 2 represents a top plan view of the burner device. Fig. 3 represents a bottom plan view thereof.

Our burner is preferably used in a furnace, A, which contains the fire box, and having a downwardly extension, A', of the iron shell to form an air chamber and hold the burner D. The shell of the chamber for outgoing products of combustion connects with furnace A, as indicated at B. The iron shell of furnace A, is provided near its bottom with an inwardly projecting annular flange or with lugs, $a^2$, which support the lining $a'$, of fire-clay or other non-conducting material. A lighting opening, $a$, having a door $x$, is formed in the wall of furnace A, for giving convenient access to the burner.

The burner D, is preferably made of circular form and of sufficiently large diameter to completely fill the horizontal area of the combustion chamber, and projects at its edges beyond the interior surface of the lining, as shown in Fig. 1, and fits closely against the lining and the annular flange, $a^2$, so that no air can pass into the combustion furnace around its peripheral edges.

The burner is constructed with a dished or flanged top-plate, $d$, having upwardly turned edges, as shown, and also having a circle of tubular openings, $d'$, which are preferably tapered from below upward, as shown in Fig. 1. The space between the upwardly turned flange and around the tubular openings or nozzles, $d'$, is filled in with asbestos-mortar or other non-conducting material $e$, for protecting the metallic tubes or nozzles from injury by heat.

A dished or hollow bottom plate, F, is secured by bolt, $c$, to the under side of the top plate, $d$, and is provided with a central opening, $f'$, at which place there is connected the gas and air mixing and supply pipe G. The hollow plate F, contains the gas and air chamber F', and is constructed with a circle of tapering tubular openings or nozzles, $f$, open at their upper and lower ends, and projecting into the tubular nozzle, $d'$, as shown in Figs. 1 and 2. The annular nozzles $d'$, serve for the admission of gas or mixed gas and air which is completely burned in the combustion chamber B', by the secondary air supply flowing up through the nozzles, $f$.

The gas and air mixing and supply pipe G, is provided at its inner up-turned end with an annular flange, $g$, which is secured by screw-bolts or rivets, $c'$ to the bottom-plate F, and said pipe is provided at its outer end with an enlargement, $g'$, having a circle of elongated openings $g''$, for the admission of air to be mixed with the gas.

A sleeve or collar, J, is arranged to slide and turn upon the pipe G, so as to control the air inlet openings, or ports $g'$. An annular valve or damper, H, (Figs. 1 and 3) having a circle of suitable openings, $h$, is loosely supported in contact with the under side of plate F, by means of the headed screws $k$, and is also guided by the pins, $i$, so that said damper is free to rotate in contact with plate F, and thereby control the admission of air to the nozzles $f$. The openings, $h$, in damper H are so spaced as to register with the air nozzles $f$, and are spaced a sufficient distance apart to permit the nozzles $f$, to be completely closed by the damper.

The gas supply pipe, L, is provided with the plug valve, $l$, and with a screw-threaded extension or nozzle, $l'$, which projects into the rear end of pipe G, with its inner end adjacent to the air ports, $g''$.

The stem of plug valve, $l$, is provided with a lever-handle $m$, and an arm, $m'$, at right angles to the handle, $m$, or at any desired angle thereto; and the outer end of said arm is pivotally connected by means of the thumb-screw, $o$, to the outer end of rod K, which is connected to the sleeve or collar J, by means of a screw or pin, $j$, and to the damper H, by means of the screw or pin, $h'$. The connections at the pins $j$ and $h'$, are loose, so as to provide perfect freedom of movement of the collar J and the damper H. It will thus be seen that the gas supply valve $l$ and the air inlet ports, $g''$, are simultaneously controlled by one lever and by a single movement thereof, whereby complete combustion of the gas is always insured; and, at the same time, lighting back is prevented. The secondary air supply to the burner nozzles, $f$, is also controlled by the same lever handle $m$ and connecting rod K, so that perfect control is had of the gas supply, the primary air supply for mixing with the gas, and the secondary air supply for causing complete combustion at the burner nozzles, thereby insuring entire safety, economy in the use of gas and entirely satisfactory results in the combustion of gas and in the heating effect thereof.

We have found it quite advantageous in practice to admit air centrally through an opening or nozzle surrounded by an annular supply of inflowing gas, as in our improved burner.

Having described our invention, what we claim, and desire to secure by Letters Patent, is—

1. A gas burner constructed with a gas and air mixing chamber having upwardly projecting annular burner nozzles and a series of air supply nozzles passing through said mixing chamber and into the burner nozzles thereof and open at their lower ends, in combination with a damper loosely connected to the bottom of said mixing chamber and adapted to control the admission of air to said air nozzles, an air mixing and supply pipe, connecting with said mixing chamber in the burner, and having air inlet ports at its outer end, a gas supply pipe entering said mixing pipe and provided with a plug valve having a handle and arm, a rod pivotally connected to said damper and to said arm of the plug valve for simultaneously controlling the supply of gas and the secondary supply of air to the burner nozzles, substantially as described.

2. A gas burner having air supply nozzles, in combination with a damper, provided with openings and adapted to control the admission of air to said nozzles, a gas and air mixing and supply pipe having air inlet ports, a gas supply pipe having a nozzle entering said mixing pipe, a sliding sleeve or collar, on said mixing pipe, a valve in said gas pipe and suitable connections between said damper, collar and valve, whereby all of them may be simultaneously moved for controlling the supply of air and gas to the burner nozzles, substantially as described.

In testimony whereof we affix our signatures in presence of two witnesses.

HAWLEY PETTIBONE.
BURDETT LOOMIS, JR.

Witnesses:
BURDETT LOOMIS,
E. L. PETTIBONE.